United States Patent [19]
Akers

[11] Patent Number: 6,141,330
[45] Date of Patent: Oct. 31, 2000

[54] MULTIPLE ISDN AND POTS CARRIER SYSTEM

[75] Inventor: Francis I. Akers, San Mateo, Calif.

[73] Assignee: GoDigital Networks Corporation, Fremont, Calif.

[21] Appl. No.: 08/717,475

[22] Filed: Sep. 20, 1996

[51] Int. Cl.[7] .................................................. H04L 12/16
[52] U.S. Cl. .......................................... 370/264; 370/535
[58] Field of Search ..................................... 370/263, 264, 370/265, 270, 271, 391, 532, 536, 537, 538, 542, 543, 535; 379/2, 191, 199

[56] References Cited

U.S. PATENT DOCUMENTS

| | | | |
|---|---|---|---|
| 3,660,609 | 5/1972 | Tremblay et al. | 179/16 F |
| 3,746,795 | 7/1973 | Fitzsimons et al. | 179/16 F |
| 4,730,311 | 3/1988 | Carse et al. | 370/522 |
| 4,853,949 | 8/1989 | Schorr et al. | 379/2 |
| 5,140,630 | 8/1992 | Fry et al. | 379/179 |
| 5,247,347 | 9/1993 | Litteral et al. | 358/85 |
| 5,400,322 | 3/1995 | Hunt et al. | 370/468 |
| 5,410,343 | 4/1995 | Coddington et al. | 348/7 |
| 5,420,886 | 5/1995 | Ohmori | 375/258 |
| 5,436,895 | 7/1995 | Matsumoto | 370/391 |
| 5,440,335 | 8/1995 | Beveridge | 348/13 |
| 5,448,635 | 9/1995 | Biehl et al. | 379/399 |
| 5,450,486 | 9/1995 | Maas et al. | 379/399 |
| 5,459,729 | 10/1995 | Bliven | 370/112 |
| 5,528,281 | 6/1996 | Grady et al. | 348/7 |
| 5,566,301 | 10/1996 | Koz et al. | 709/250 |
| 5,577,115 | 11/1996 | Deutsch et al. | 379/399 |
| 5,596,604 | 1/1997 | Cioffi et al. | 375/260 |
| 5,598,413 | 1/1997 | Sansom et al. | 370/468 |
| 5,610,922 | 3/1997 | Balatoni | 370/468 |
| 5,621,731 | 4/1997 | Dale et al. | 370/257 |
| 5,627,833 | 5/1997 | Bliven | 370/464 |
| 5,657,381 | 8/1997 | Hughes-Hartogs | 379/100.12 |
| 5,668,814 | 9/1997 | Balatoni | 370/540 |
| 5,682,385 | 10/1997 | Garcia et al. | 370/458 |
| 5,691,718 | 11/1997 | Balatoni et al. | 370/112 |
| 5,787,088 | 7/1998 | Dagdeviren et al. | 370/493 |
| 5,815,505 | 9/1998 | Mills | 370/522 |

FOREIGN PATENT DOCUMENTS

| | | |
|---|---|---|
| 0 251 986 A2 | 1/1988 | European Pat. Off. ......... H04Q 5/02 |
| 0 251 986 A3 | 1/1988 | European Pat. Off. ......... H04Q 5/02 |
| WO 96/29814 | 9/1996 | European Pat. Off. . |

OTHER PUBLICATIONS

"ISDN Basic Access Digital Subscriber Lines," Bell Communications Research, Technical Advisory, TA–TSY–000363, Issue 1, Mar. 1987.

"Universal Digital Channel (UDC) Requirements and Objectives," Bell Communications Research, Technical Advisory, TA–TSY–000398, Issue 1, Sep. 1986.

"Making the Transition: Fiber winds its way home," Telephony Integrating Voice and Data Communications, Feb. 1988.

"2B1Q, Line Code Tutorial," MSAN–127, Mitel Semiconductor Product News, Jan. 1987.

(List continued on next page.)

*Primary Examiner*—Chi H. Pham
*Assistant Examiner*—Kwang B. Yao
*Attorney, Agent, or Firm*—Limbach & Limbach L.L.P.; Seong-Kun Oh

[57] ABSTRACT

High-speed digital transmission can be achieved with existing phone lines and HDSL chipsets while retaining plain old telephone service (POTS) with full failsafe capability. Two original ISDN signals [4,5] at a rate of 160 kbps and one POTS channel [10] digitized at 64 kbps are multiplexed by a MIPCS card [6] of a signal provider [1]. The resulting digital signal is transported over a twisted cable pair [2] which has an approximate maximum length of 16 kft based on the current technology. At a receiving end, the signal is demultiplexed and regenerated by a subscriber's MIPCS card [7]. The subscriber's MIPCS card is line-powered via the cable [2] to avoid dependence upon local power. The regenerated signals are transmitted over one POTS line [42] and two ISDN cables [8,9] to remote premises. Both MIPCS cards have bypass relays for the POTS lines to ensure the subscriber's POTS access in the event of a local power outage or electronic failure.

31 Claims, 4 Drawing Sheets-

OTHER PUBLICATIONS

"Implementing an ISDN Architecture Using the ST–Bus," MSAN–128, Mitel Semiconductor Product News, Mar. 1987.

Time Space Switching of 8, 16 or 32K Bps Channels Using the MT8980, MSAN–129, Mitel Semiconductor Product News, Apr. 1987.

"Implementation Details of the MT8930 S/T Interface" MSAN–130, Mitel Semiconductor Product News, Oct. 1988.

"Digital Networks, Digital Sections and Digital Line Systems," The International Telegraph and Telephone Consultative Committee, ISBN 92–61–03351–2, Nov. 1988.

"A Two–Wire Digital 0+2 Local–Line System for the Voice Network," British Telecommunications Headquarters, Specification RC 7328, Apr. 1988.

Requirements and Objectives for Digital Main Line (DAML), Pacific Bell, PUB L–780057–PB/NB, Issue 1, May 1989.

Article on "BT8960 Single–Chip 2B1Q Transceiver", Mar. 1996.

ISDN–Network Interface Unit (I–NIU) Request for Quotation RFQ #N96–NET–0049 Technical and Environmental Requirements.

U.S. Patent Application No. 08/701813, filed Aug. 21, 1996.

U.S. Patent Application No. 08/747,068, filed Nov. 8, 1996.

"ISDN Basic Access Digitial Subscriber Lines", Technical Reference TR–TSY–000393, Bellcore Communications Research (May 1988), "ISDN Basic Access Transport System Requirements", Technical Advisory TA–TSY–000397, Bell Communications Research (Oct. 1986).

MULTIPLE ISDN AND POTS CARRIER SYSTEM

FIELD OF THE INVENTION

The field of the invention relates generally to high speed digital communication. More particularly, the field of the invention relates to transportation of two ISDN signals and one POTS signal over one twisted cable pair from a front end and regeneration of the ISDN and POTS signals at a remote end.

BACKGROUND OF THE INVENTION

The recent growth of the Internet has created both a tremendous demand for additional subscriber access to public switched telephone networks (PSTN) and a demand for additional bandwidth for the access. The former demand is being met by deploying additional analog access lines so that modems can be used for the Internet access, and the latter demand is being met by deploying integrated service digital network (ISDN) lines over twisted cables. In the first case, although Internet access is provided, it is not of sufficient bandwidth to provide the graphic-rich service which typically is desired. In the latter case, a subscriber's main standard plain old telephone service (POTS) line is not converted to ISDN in order to maintain the subscriber's POTS access in the event of a local power outage or electronic system failure because the ISDN service is dependent upon the residence power and proper function of the ISDN electronics. In both cases, the installation of an additional copper-pair based access line is expensive and time consuming due to a general shortage of pre-existing installed cable pairs.

In the latter case, the ISDN installation on existing cable pairs is limited to about 70% of the installed base due to the manner in which ISDN transport was designed specifically for non-loaded cable plants. The existing copper cable outside plant was constructed in accordance with design requirements specifying that for local loops exceeding 13 kilo-ohms (kΩ), or approximately 18 kilo-feet (kft) which is equivalent to 5,486 meters, loading coils or filter capacitors are added to remove voice frequencies shifted above 4 kilo-Hertz (kHz) due to the loop resistance. The REA loop survey of 1986 indicates that for the US as a whole, approximately 85% of all loops are non-loaded. Since ISDN uses a digital signal operating at a center frequency of 40 kHz, it will not transmit in the presence of a load coil. Bridged taps or branches attached to a primary cable run further reduce the reach of an ISDN signal, with the net result being that only about 70% of all existing subscribers can have ISDN service added without additional construction expenses, as reported by Pacific Bell in early 1996. Therefore, providing ubiquitous digital access for all telephone subscribers is limited by both the number of pre-existing cable pairs and limitations imposed by the design of the telephone outside plant.

One solution is for the telephone company to simply install more copper cables. In fact, record amounts of copper cables are being installed in response to the huge demand for added lines. But this is not a financially viable alternative for the telephone companies due to the long depreciation schedule for these cables. It is generally recognized that a higher-bandwidth medium, such as fiber optic cable, is the ultimate solution for the digital access though the fiber connectivity precludes the lifeline access in the event of local power failures. While the technical and financial issues related to fiber installation are being worked out, installing copper cables only consumes capital and delays the day for fiber-ization.

One other approach is to more efficiently utilize existing phone lines for high-speed digital transmissions. The phone lines are made of twisted copper pairs and are configured in a star-like architecture that is suitable for bi-directional communications. The principal technology for placing a digital signal onto a copper pair that originally provided only analog dial tone is called integrated service digital network (ISDN). ISDN was developed in the 1980's, when the state-of-the-art digital encoding technology resulted in the standards as described in Bellcore documents TR-TSY-000393 and TR-TSY-000397. The basic transmission speed, called BRI for ISDN is 160 kilobits per second (kbps). This digital rate and its corresponding communication method are digital subscriber line (DSL). It is significant that ISDN was designed specifically for a non-loaded telephone plant since loading capacitors effectively attenuated high frequency digital signals. The non-loaded cable plant reaches 18 kft but only 85% of all subscribers on average. This results in a problem with respect to reaching all subscribers desiring ISDN services. Since 1990, the development of microprocessors has significantly improved the performance of communication chipsets. High bit rate subscriber line (HDSL) chipsets can run at 784 kbps or even 1 Mbps to transport one half of a T1/E1 digital loop carrier signal in an application called "Repeaterless T1/E1." Other types of high speed communication technologies for the twisted pairs, such as asymmetric DSL (ADSL), are emerging from labs but are still too expensive for wide range applications. HDSL technology can be used to transport either one high speed signal or several lower speed signals through multiplexing and demultiplexing. Installing one high bit line for multiple lower bit signals is more cost effective than installing several lower bit lines. This approach was explored by several inventors in the past.

By way of example, Carse et al., U.S. Pat. No. 4,730,311 describe a multiplexer for use in a telephone system in which a plurality of subscriber locations are connected to a central office by a single subscriber loop. Carse et al. focus on the design of the multiplexer rather than the entire communication system. Their technique applies generally to any methods of digital transmission, consequently the transmission rate is arbitrary. The subscribers are defined to be locally powered and backed-up with battery power. The battery back-up can only last for a limited period of time in the case of local power loss. For the design of the multiplexer, Carse et al. do not define either a digital interface or standard of loopback testing. Also, the configuration of the central office is not described.

Litteral et al., U.S. Pat. No. 5,247,347 and Coddington et al., U.S. Pat. No. 5,410,343 define how to provide digital video signals from a video information provider to one or more of a plurality of subscriber premises. However, the multiplexers used in both systems mainly perform frequency domain multiplexing/demultiplexing which is inherently disadvantageous with respect to time domain multiplexing/demultiplexing. The power source of the multiplexers is not specified. In addition, Litteral et al. and Coddington et al. only describe transport and encoding of specific video signals rather than generic digital signals. Bliven, U.S. Pat. No. 5,459,729 describes a method and apparatus for transmitting and receiving multiple telephone signals over a single twisted pair. Two conventional telephone signals are converted into one digital signal and then transported over a single twisted pair at a rate of 160 kbps. Creating a multiplicity of telephone channels in this way is sufficient for analog POTS but is too low to provide adequate Internet access.

Accordingly, it is a primary object of the present invention to provide a communication system that transports multiple ISDN signals and a POTS channel over a single twisted cable pair at a high bit rate. It is a further object of the invention to provide line powering to a remote terminal to avoid dependence upon local power and to provide for a metallic POTS access in the event of electronic failures. This invention is subsequently referred to as a "multiple ISDN and POTS carrier system" or abbreviated as "MIPCS."

SUMMARY OF THE INVENTION

These and other objects and advantages are attained by connecting a signal provider to a signal subscriber through a twisted cable pair. The maximum length of the cable is approximately 16 kft depending upon the wire gauge, which offers roughly 1.2 kΩ loop resistance, from the signal provider to the signal subscriber, back to the signal provider. The signal provider comprises one MIPCS card powered by a 48-Volt power supply. The MIPCS card connects two ISDN cards and one POTS line card to the twisted cable pair. The ISDN cards provide a digital interface between a PSTN and a local ISDN network at a transmission rate of 160 kbps. The components of the MIPCS card comprise a transceiver, a digital interface module, a subscriber line interface (SLI) module, a bypass relay, and a utility microprocessor. The transceiver uses a 2B1Q transport mechanism and operates at a minimum rate of 384 kbps. The digital interface module uses two ISDN U-interfaces. The bypass relay ensures the subscriber's POTS access in the event of a local power outage or electronic failure. The utility microprocessor performs loopback testing in accordance with the National ISDN Standards.

The signal subscriber comprises a MIPCS card, one POTS line, and two ISDN cables. The MIPCS card connects the twisted cable pair to the two ISDN cables and one POTS line and is powered via the twisted cable pair. The components of the MIPCS card contain a transceiver, a digital interface module, a SLI module, a bypass relay, and a utility microprocessor which are characterized by the same structure as those of the MIPCS card of the signal provider. The two ISDN cables carry the signals to a single remote premise or multiple remote premises where networking devices (NT1's) are located. The transmission rate of the cables is 160 kbps, and their maximum length is 18 kft. The SLI module supports a POTS loop with a normal resistance of 560 Ohms and provides five ringer equivalents.

DETAILED DESCRIPTION

Figure 1:
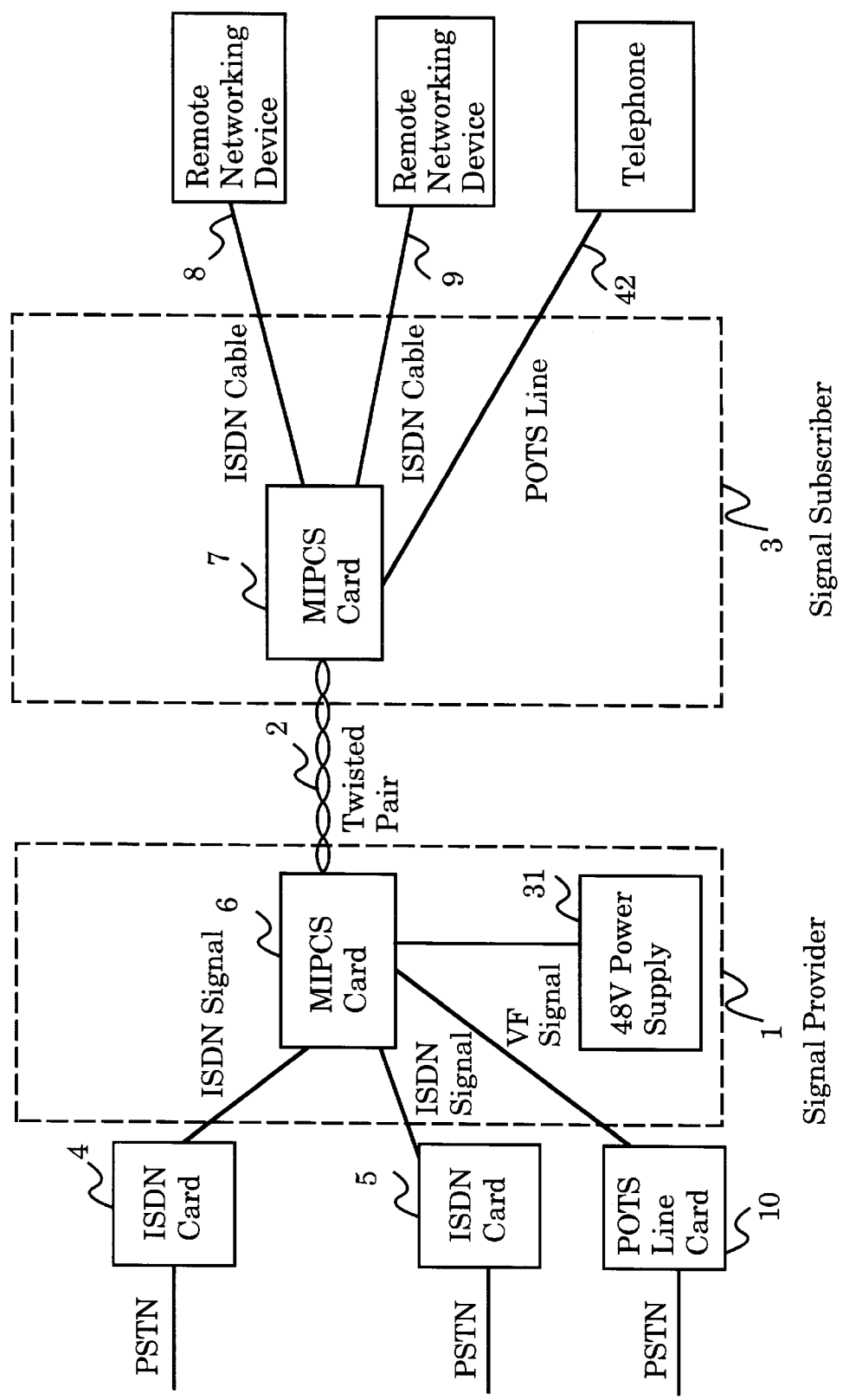
FIG. 1 is a schematic diagram of a high bit communication system with a single twisted cable pair.

A schematic diagram of an aspect of the invention is shown in FIG. 1. A signal provider 1 comprises a MIPCS card 6 which connects two ISDN cards 4 and 5 and a POTS card 10 to a first end of a twisted cable pair 2. The MIPCS card 6 is plugged into an equipment shelf, constituting a signal provider terminal. The ISDN cards 4 and 5 convert an E1 or T1 signal on a PSTN into a 160-kbps ISDN signal on a local ISDN network. The ISDN and POTS signals are then multiplexed by the MIPCS card 6, and the multiplexed signal is sent to a signal subscriber 3 over the twisted cable pair 2. The MIPCS card 6 is powered by a 48-Volt power supply 31. Since each of the ISDN signals has a rate of 160 kbps and a digitized POTS channel occupies 64 kbps, the twisted cable pair 2 is required to provide a minimum speed of 384 kbps. The maximum length of the cable is limited by either the MIPCS system's ability to transmit the powering voltage, or the signal processing ability of the digital encoding chip. For example, the BROOKTREE 8960 chip has an advertised reach of 16.5 kft. Both of these limitations are due to a combination of loop resistance, loop capacitance, and other signal attenuation and degrading influences. The reach of a digital system may be increased by removing bridged taps, or by renewing cable splices, or by replacing cables having water intrusion, so the system reach is not only variable but also controllable to some extent, depending on the value of providing the digital service to the customer. In summary, one practical limit of the reach of the system is the loop resistance which governs powering as well as signal. Given the state of the art in digital encoding, as exemplified by the BROOKTREE 8960 chip, 1.2 kΩ is roughly a practical limit, and this corresponds to approximately 16.5 kft on mixed 26 and 24 gauge cable plant. It is anticipated that the practical reach of the MIPCS system may increase as improvements are made in subsequently available digital encoding chips which replace the BROOKTREE 8960. Similarly, if the loop is comprised of 24 AWG wire, the reach would exceed 20 Kft.

The signal subscriber 3 contains a MIPCS card 7, one POTS line 42, and two ISDN cables 8 and 9. The MIPCS card 7 is powered via the twisted cable pair 2. The amount of power which needs to be transmitted does not exceed 80 Volts on either wire in accordance with the U.S. safety standards. Internationally, the safety requirement for line-powering voltage varies and can go as low as 50 Volts on each wire. The digital signal transported over the twisted cable pair is demultiplexed and regenerated into two individual ISDN signals and one POTS channel. The regenerated ISDN signals have the same signal quality and distance capability as the original ones, and they are sent to remote premises over the two ISDN cables 8 and 9. The POTS signal is sent to the remote premises over the POTS line 42.

Figure 2:
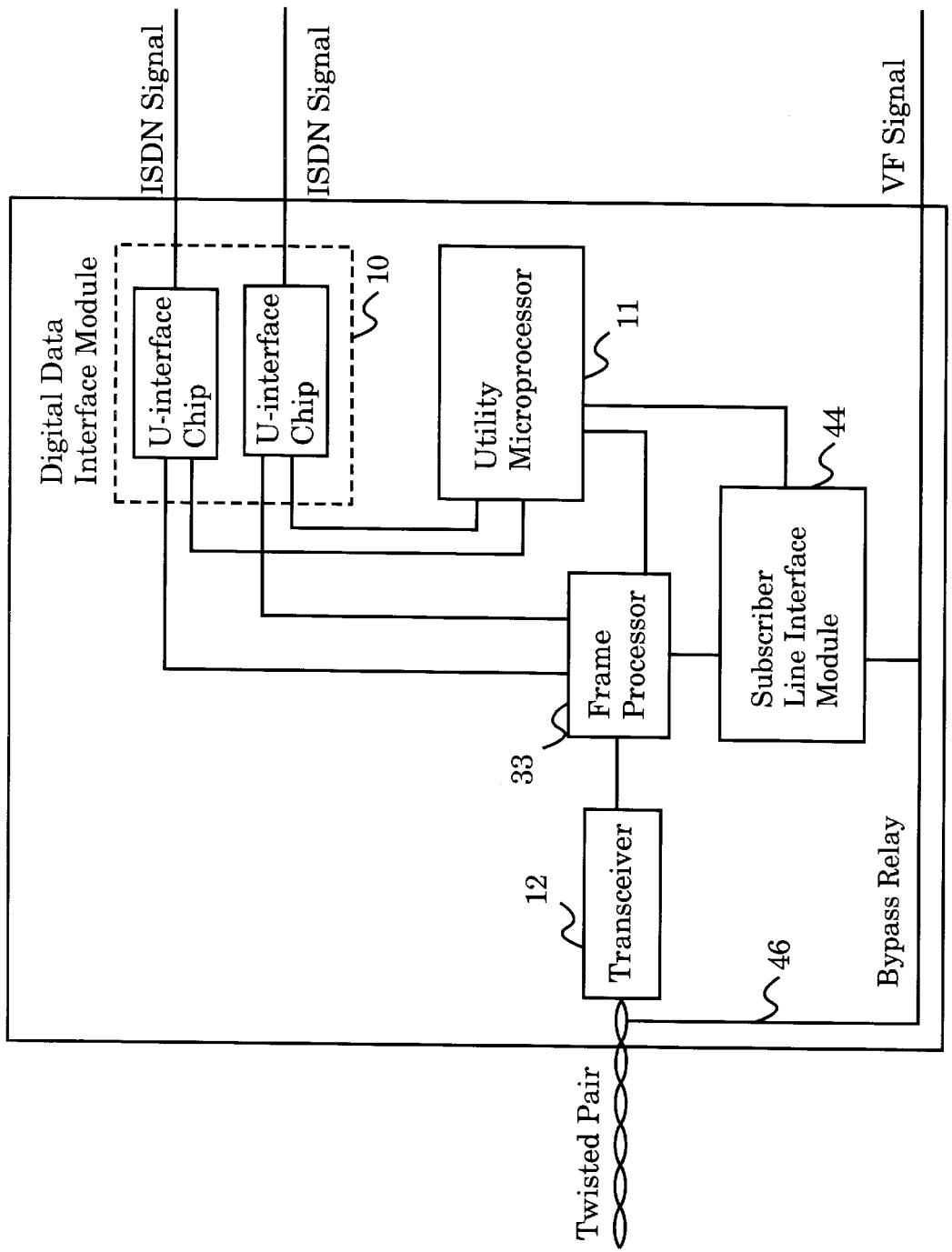
FIG. 2 is a simplified block diagram for the MIPCS cards illustrated in FIG. 1.

Each of the MIPCS cards 6 and 7 comprises a digital data interface module 10, a utility microprocessor 11, a transceiver 12, a SLI module 44, and a frame processor 33, as shown in FIG. 2. The digital data interface module 10 uses two ISDN U-interfaces, such as Motorola MC145572. The utility microprocessor 11 such as Motorola M68HC05 family provides loopback testing in accordance with the National ISDN Standards. The transceiver 12 uses a 2B1Q transport mechanism and operates at a speed of at least 384 kbps. One of such transceivers is Bt8960 DSL Transceiver by BROOKTREE Corporation with a transmission rate of 416 kbps in full duplex mode. The SLI module 44 in the MIPCS card for the signal provider emulates a telephone set for signaling purposes and converts the analog POTS channel to a digital signal which is fed to the frame processor; while the SLI module for the signal subscriber converts the digitized POTS signal to analog and provides all standard functionality, such as ringing, off-hook detection, caller identification tones, and other features. The bypass relay 46 ensures the subscriber's POTS access in the event of a electronic failure or local power outage.

Figure 3:
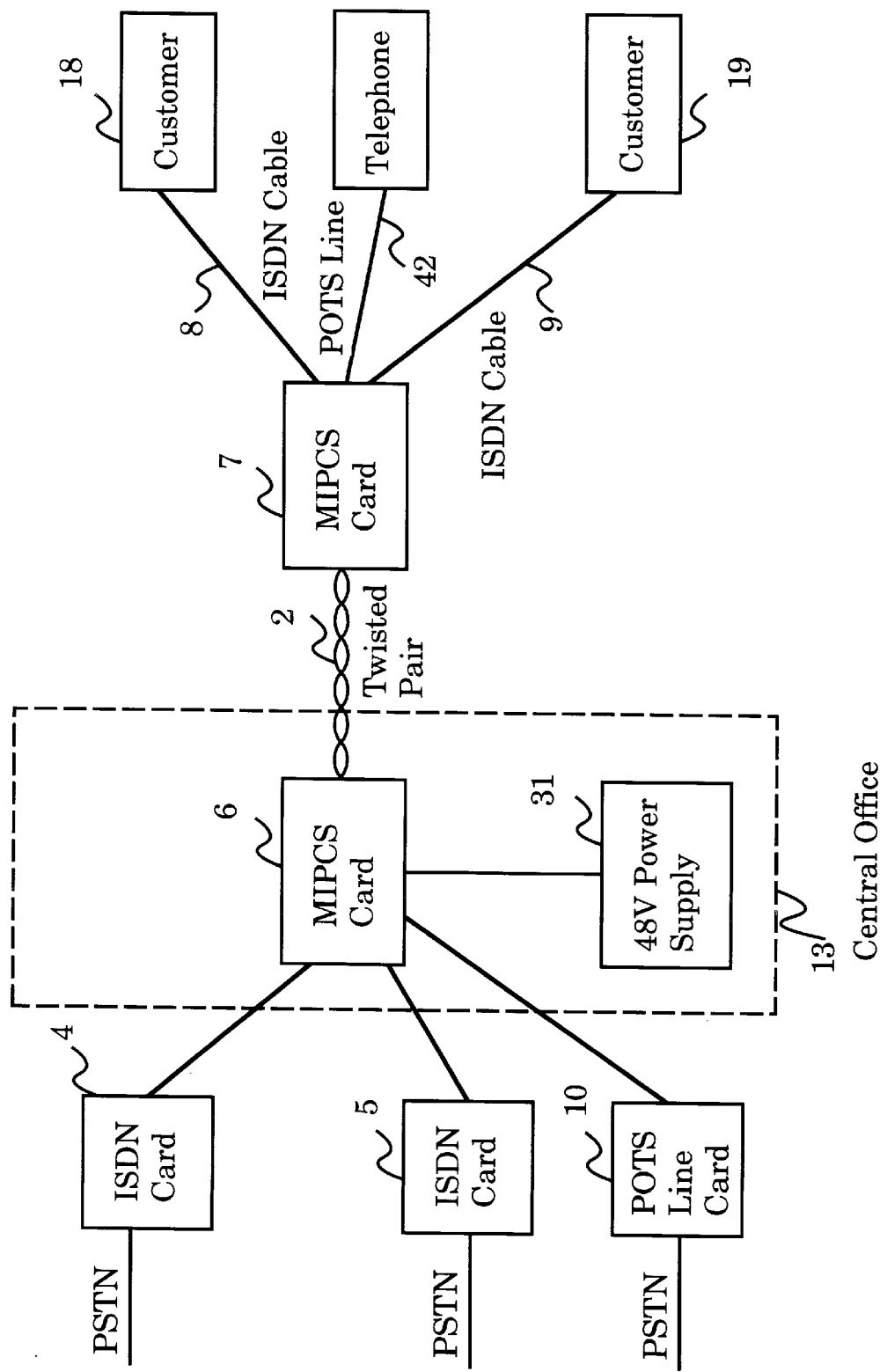
FIG. 3 is a schematic diagram according to an embodiment called office-to-house.

A first embodiment of the invention is an office-to-house system, as illustrated in FIG. 3. A MIPCS card 7 is installed on a pole, on a house, or in a cabinet. Two customers 18 and 19 in a same house or two different houses each have one ISDN access, and one of them has a POTS access. They maybe kept in close proximity for maintenance purposes. Because the MIPCS card 7 regenerates high quality ISDN signals, the two ISDN lines can be 18 kft long from the MIPCS card, but the POTS line is limited to a 130-Ohm loop or about 2-kft-long on standard 24 AWG wire.

Figure 4:
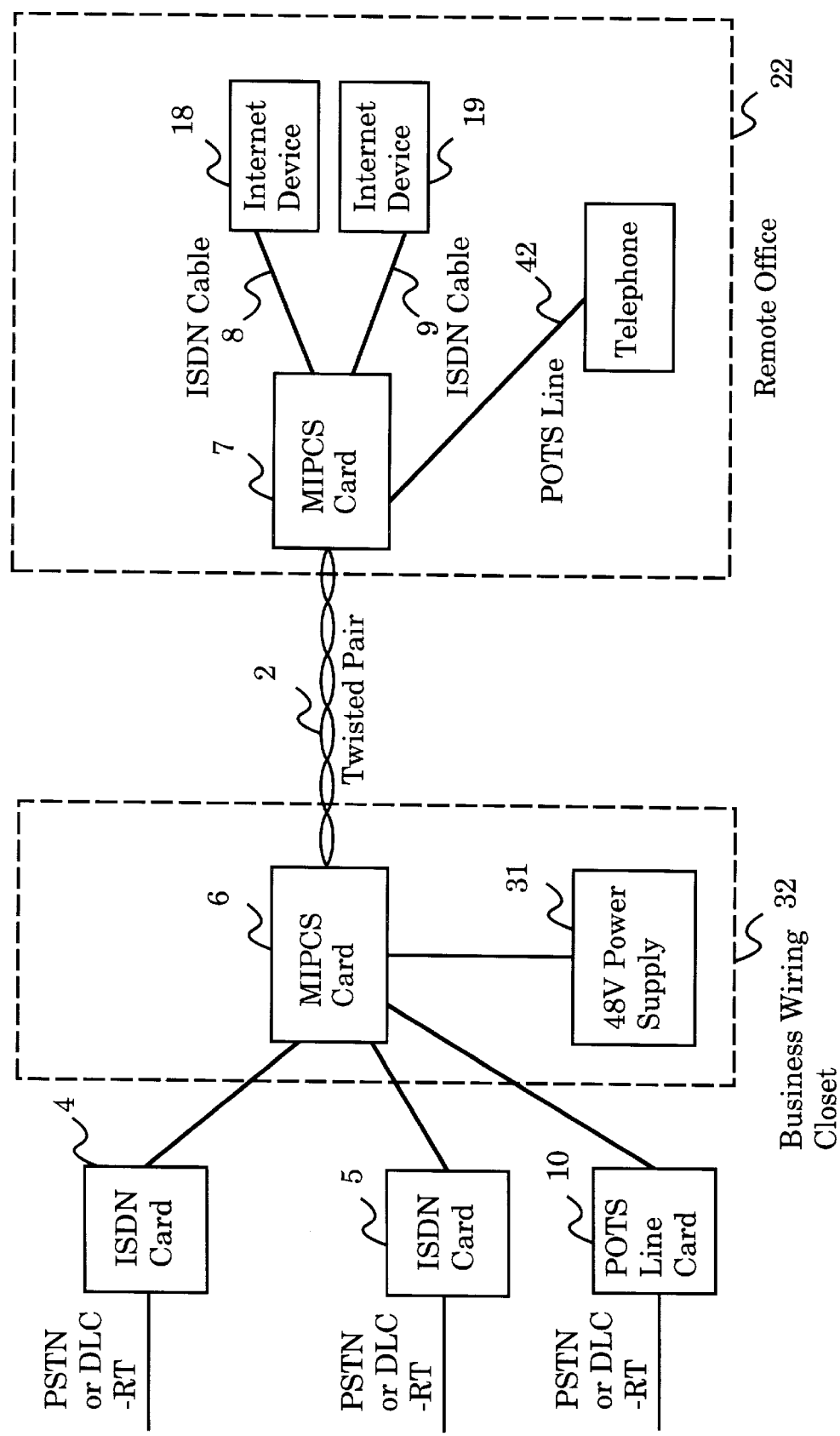
FIG. 4 is a schematic diagram according to an embodiment called corporate-intranet.

A second embodiment of the invention is a corporate-intranet system, as shown in FIG. 4. In this case, a corporate ISDN user needs ISDN accesses at a remote office 22 whose location is not permanently fixed or which is wired with only one twisted pair. The twisted cable pair 2, normally used for POTS, is temporarily or permanently converted by adding a MIPCS card 6 in a business wiring closet 32 and a MIPCS card 7 in the remote office 22 to provide two ISDN connections, in addition to the original POTS channel.

It will be clear to one skilled in the art that the above embodiments may be altered in many ways without departing from the scope of the invention. For example, more than one twisted cable pair can be used to transport more than two ISDN signals and more than one POTS channel. Accordingly, the scope of the invention should be determined by the-following claims and their legal equivalents.

What is claimed is:

1. A high bit communication system, comprising:
   a) a single twisted cable pair with line-powering capability;
   b) a signal provider configured to multiplex two ISDN signals and a POTS channel and to connect a public switched telephone network to a first end of the twisted cable pair having a transmission rate of at least 384 kbps, the signal provider including one MIPCS card which connects two ISDN cards and one POTS line card to the first end of said twisted cable pair, the MIPCS card including a transceiver, a frame processor, a digital interface module, a subscriber line interface module, a utility microprocessor, and a bypass relay; and
   c) a signal subscriber configured to demultiplex and regenerate said two ISDN signals and said POTS channel received via said twisted cable pair at said transmission rate of at least 384 kbps and to connect a second end of the twisted cable paw to remote premises;
   wherein said signal provider is configured to use a 2B1Q transport mechanism for transmitting signals at a minimum rate of 384 kbps.

2. The high bit communication system of claim 1 wherein the twisted cable pair is approximately 16 kft providing approximately 1.2 kΩ maximum loop resistance, from the signal provider to the signal subscriber, back to the signal provider.

3. The high bit communication system of claim 1 wherein said POTS channel is by default mechanically available to said subscriber in the event of either a local power loss or electronic failure.

4. The system of claim 1 wherein the ISDN cards provide digital interfaces between a public switched telephone network and a local ISDN network with a transmission rate of 160 kbps.

5. The system of claim 1 wherein the MIPCS card is powered with a 48-Volt power supply.

6. The system of claim 1 wherein the digital interface module is connected to said frame processor, said utility microprocessor, and two ISDN cables extended from said ISDN cards interfaced to the public switched telephone network and uses two ISDN U-interfaces.

7. The system of claim 1 wherein the subscriber line interface module is connected to said from processor, said utility microprocessor, and one POTS line extended from said POTS card interfaced to the public switched telephone network.

8. The system of claim 1 wherein the utility microprocessor connects said frame processor to said digital data interface module and said subscriber line interface module.

9. The system of claim 1 wherein the utility microprocessor comprises a means for providing loopback testing in accordance with the National ISDN Standards.

10. The system of claim 1 wherein the bypass relay connects said twisted pair and the POTS line extended from said POTS card interfaced to the public switched telephone network.

11. The high bit communication system of claim 1 wherein the signal subscriber comprises one MIPCS card, two ISDN cables having a first end and a second end, and one POTS line having a first end and a second end.

12. The system of claim 11 wherein the MIPCS card connects the second end of the twisted cable pair to the first ends of the ISDN cables and POTS line.

13. The system of claim 11 wherein the MIPCS card is powered via the twisted cable pair, and the line voltage does not exceed 160 Volts in total or 80 Volts per wire in accordance with the US safety standards.

14. The system of claim 11 wherein the MIPCS card is powered via the twisted cable pair in accordance with the international safety standards, which vary and can go as low as 50 Volts on each wire.

15. The system of claim 11 wherein the MIPCS card comprises a transceiver, a frame processor, a digital interface module, a subscriber line interface module, a utility microprocessor, and a bypass relay.

16. The system of claim 15 wherein the digital interface module connects said frame processor, said utility microprocessor, and said first ends of said two ISDN cables, and uses two ISDN U-interfaces.

17. The system of claim 15 wherein the subscriber line interface module is connected to said frame processor, said utility microprocessor, and the first end of said POTS line.

18. The system of claim 15 wherein the subscriber line interface module supports a local loop of up to 530-Ohm resistance with five ringer equivalents.

19. The system of claim 15 wherein the utility microprocessor connects said frame processor to said digital data interface module and said subscriber line interface module.

20. The system of claim 15 wherein the utility microprocessor is adapted to provide for loopback testing in accordance with the National ISDN Standards.

21. The system of claim 15 wherein the bypass relay connects said twisted pair and the first end of said POTS line.

22. The system of claim 11 wherein said ISDN cables and said POTS line connect the MIPCS card to remote premises.

23. The system of claim 11 wherein the ISDN cables have a transmission rate of 160 kbps and a maximum length of 18 kft.

24. The system of claim 11 wherein the POTS line has a maximum length of 2 kft which corresponds to a loop resistance of 130 Ohms.

25. A high bit communication system, comprising:
   a single twisted cable pair;
   a signal provider configured to multiplex at least two ISDN signals and a POTS signal, each of said ISDN signals having a transmission rate of 160 kbps and said POTS signal having a transmission rate of 64 kbps, wherein said signal provider includes a first transceiver, a first frame processor, a digital interface module, a subscriber line interface module, a utility microprocessor, and a bypass relay, said first transceiver configured to couple said single twisted cable pair to said frame processor, and to transmit digital signals at a minimum rate of 384 kbps; and a signal subscriber configured to receive said multiplexed signal from said signal provider via said twisted cable pair at said transmission rate of at least 384 kbps, said signal subscriber further configured to demultiplex said multiplexed signal and to re-generate said two ISDN signals and said POTS signal at said transmission rates of 160 kbps and 64 kbps, respectively;

wherein said signal provider is further configured to use a 2B1Q transport mechanism for transmitting signals at a minimum rate of 384 kbps.

26. The system of 25 wherein said twisted cable pair transmission rate is 416 kbps.

27. The system of claim 25 wherein said signal subscriber includes a second transceiver and a second frame processor, said second transceiver configured to couple said single twisted cable pair and said frame processor, and to transmit digital signals at a minimum rate of 384 kpbs.

28. The system of claim 25 wherein the twisted cable pair is approximately 16 kft providing approximately 1.2 kΩ maximum loop resistance, from the signal provider to the signal subscriber, back to the signal provider.

29. A method of transmitting two ISDN signals and one POTS signal, said method comprising the steps of:

multiplexing at least two ISDN signals and a POTS signal, each of said ISDN signals having a transmission rate of 160 kbps and said POTS signal having a transmission rate of 64 kbps, and in accordance thereto, generating a multiplexed signal, said generating step including the step of providing a transceiver, a frame processor, a digital interface module, a subscriber line interface module, a utility microprocessor, and a bypass relay;

providing said multiplexed signal to a first end of said twisted cable pair at a twisted cable pair transmission rate of at least 384 kbps using a 2B1Q transport mechanism;

receiving said multiplexed signal from said signal provider via said twisted cable pair at said transmission rate of at least 384 kbps; and demultiplexing said multiplexed signal to re-generate said two ISDN signals and said POTS signal at said transmission rates of 160 kbps and 64 kbps, respectively.

30. The method of claim 29 wherein said twisted cable pair transmission rate is 416 kbps.

31. The method of claim 29 where in the twisted cable pair provides approximately 1.2 kΩ maximum loop resistance from the signal provider to the signal subscriber back to the signal provider.

* * * * *